Patented Apr. 15, 1930

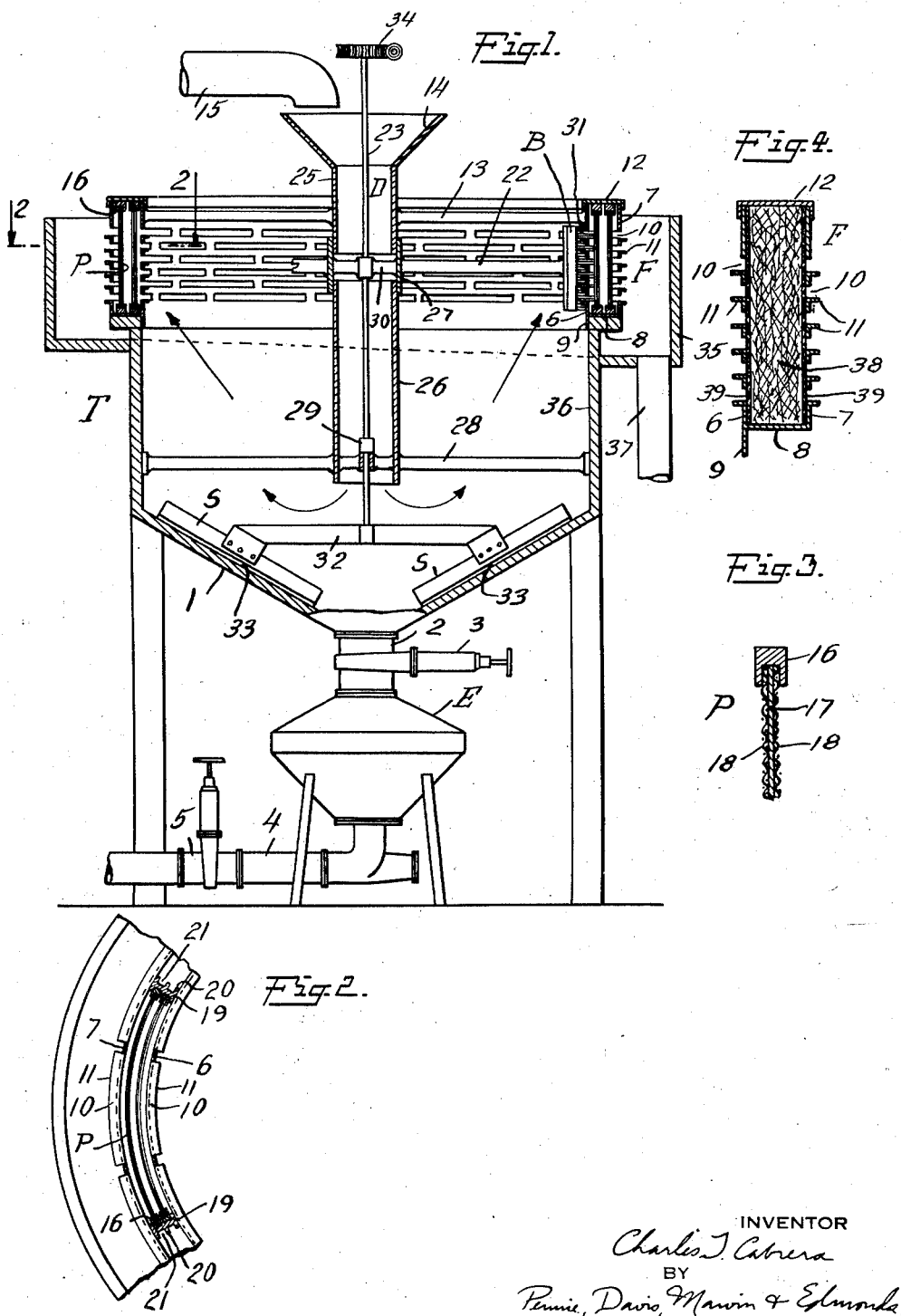

1,754,667

UNITED STATES PATENT OFFICE

CHARLES T. CABRERA, OF NEW YORK, N. Y., ASSIGNOR TO ELECTRO DIALYZER CORPORATION, OF NEW YORK, N. Y., A CORPORATION OF NEW YORK

FILTRATION APPARATUS

Application filed July 26, 1928. Serial No. 295,585.

This invention relates to a filtration device, and more particularly concerns an improved device for subjecting a solid laden liquid to sedimentation and filtration treatments.

Many solid laden liquids such as sewage, and various waste liquids from pulp and textile mills and from canning and other industrial plants, must be subjected to some form of treatment for the removal of the soluble and insoluble solids therefrom. It is often desirable or essential, particularly in the treatment of sewage, that very large quantities of the solid laden liquid be continuously treated, and it is further desirable that this treatment include both the sedimentation of the heavy solids and the filtration of the light soluble or colloidal solids from the liquid. In order to effect substantially complete separation between the liquid and the solids contained therein, particularly when the solid laden liquid comprises sewage, it is usually desirable to successively subject the liquid to several different treatments. Thus the liquid is usually first allowed to stand or flow slowly through suitable containers to permit the sedimentary solids to settle out, and is subsequently passed through suitable filter beds to strain the remaining solids therefrom.

The known apparatus for carrying out these successive treatments is unsatisfactory in various respects. Many of the filter beds previously employed for straining the solids from the liquid vehicle become clogged with solid matter rather quickly and the cleaning of such beds presents a difficult problem. It is usually necessary to discontinue the operation of the filtration apparatus for at least a time while the filter beds are being cleaned or changed, and this is obviously highly undesirable where a large quantity of liquid must be continuously treated. In many forms of filtration apparatus, the filter beds are formed of cloth or other fabrics, and when these beds become clogged with solid material the water pressure thereon frequently causes the rupture thereof and unfiltered liquid is thereby passed through the filtration apparatus. Since an appreciable hydraulic head must be maintained upon the solid laden liquid to force it through the filter beds, it is exceedingly difficult to prevent the injury of fabric filter beds in this manner, particularly where the nature of the solid laden liquid is such that the filtering fabrics clog quickly. Further, the heavy solids which settle from the liquid during the sedimentation process frequently become lodged in the lower portion of the sedimentation container, clogging the solid outlet opening and necessitating further interruptions in the filtration process.

With the above and other considerations in mind, it is proposed in accordance with the present invention to provide an improved filtration device including means for successively subjecting a solid laden liquid to sedimentation and filtration treatments. More specifically, it is proposed to provide a device of this character in which the filtering medium is so disposed and arranged that it may be cleaned or replaced without any interruption in the filtration process, and in which the clogging of the filtering material automatically causes the flow of the solid laden liquid through clean or unclogged portions of the filtering material, thereby preventing the rupture or injury of the filter beds due to sudden increases in the hydraulic pressure applied thereto. It is a further object of the invention to provide means for continuously cleaning the surface of the filtering material, and also means for continuously dislodging the sedimentary solids from the bottom of the sedimentation container.

Various other specific objects, advantages and characteristic features of the present invention will become apparent as the description thereof progresses.

In general, the objects of the present invention are carried out by causing the solid laden liquid to flow upwardly in a specially designed container, the upper portions of the side walls of which comprise permeable filtering partitions through which the effluent liquid passes. The liquid to be treated is introduced at the center of the container near the bottom wall thereof and thus flows in a diagonal stream toward the filtering partitions. The heavy solids settle from the liquid and fall to the bottom of the container during the diagonal flow of the liquid toward the filtering partitions. The filtering medium comprises a vertically disposed extension on the side walls of the container, and the solid laden liquid first passes through the lower portions of this medium. As the lower portions of the filtering medium become clogged with solid matter, the liquid within the container rises to a higher level and flows through the clear, unclogged portions of the filter. The filtering material is preferably divided into sections and comprises a plurality of frames which are removably secured within a hollow perforated extension of the container walls. Means are provided for supporting a plurality of these filter frames or partitions in superimposed relation whereby a clean filtering partition may be introduced before the removal of a clogged filtering partition, and the filtration process need not be even momentarily interrupted during the replacement of a clogged filter. The sedimentation container as well as the filtering partitions secured thereto are preferably circular or cylindrical in shape and rotary means are provided for continuously cleaning the inner surface of the filter bed and for continuously dislodging the settled solids from the bottom of the container.

In describing the invention in detail, reference will be made to the accompanying drawings, in which:

Figure 1 is a sectional side elevation of the filtering device of the present invention;

Fig. 2 is a sectional view, taken along the line 2—2 and viewed in the direction of the arrows;

Fig. 3 is a cross section of one of the filtering elements employed in connection with one embodiment of the invention; and Fig. 4 is an enlarged sectional view of a modified form of filtration element.

Referring to the drawings and more particularly to Fig. 1, the embodiment of the invention disclosed herein comprises generally a circular tank or container T having a tapered or conical bottom wall 1. A sludge outlet pipe 2 communicates with the lower apex of the bottom wall 1, this pipe being preferably provided with a cut-off valve 3. An ejector E is connected to the pipe 2, and is in turn connected to a discharge pipe 4 provided with a cut-off valve 5. The particular construction of the ejector employed forms no part of the present invention and will not be described herein, it being sufficient to explain that this device operates, with the aid of compressed air or otherwise, to carry the accumulated sludge or sediment away from the bottom of the tank T.

A filter retaining element comprising a cylindrical hollow extension F is suitably secured to and extends upwardly from the upper edge of the container T. This extension is preferably formed of sheet material, and comprises a pair of concentric cylindrical side walls 6 and 7 connected by the bottom wall 8. A downwardly extending flange 9 is preferably provided at the inner lower edge of the extension F to facilitate the connection of the extension to the container T. The side walls 6 and 7 of the extension F are suitably perforated, and in the embodiment shown, these perforations comprise a plurality of horizontal slots 10 which may be staggered, as shown in Fig. 1, or otherwise suitably disposed. The slots 10 may be conveniently formed by bending rectangular strips of the side walls outwardly and downwardly, and in this manner, each of the slots 10 is provided with an outwardly extending lip or ledge 11, as shown in Figs. 1 and 4. A removable cover 12 may be provided to close the upper end of the hollow extension F if desired.

Referring now to the filtering medium employed in the device, in one form of the invention this medium comprises a plurality of filtering partitions P which are slidably supported within the hollow extension F. As shown in Figs. 2 and 3, each filtering partition comprises a frame 16 of arcuate section, and a sheet of filtering material such as a filter cloth 17 of canvas, duck, drill, burlap or other suitable material is secured across this frame. The sheet of filtering material 17 is preferably enclosed between a pair of protecting screens 18 of wire cloth or other strong permeable material. A plurality of vertically extending columns 19 are suitably secured within the hollow extension F at equally spaced points therein, these columns being provided with a plurality of oppositely disposed extensions 20 forming a plurality of parallel grooves or slots 21 on the opposite sides thereof for slidably receiving and supporting the frames 16 of the filtering partitions P. As shown in Fig. 2, each adjacent pair of columns presents two pairs of oppositely disposed grooves in which two superimposed filtering partitions may be slidably inserted. The provision of these supporting means for a plurality of superimposed filtering partitions permits the removal and replacement of the partitions without interruptions of the filtering process as hereinafter more fully explained.

A vertical inlet duct D is centrally supported within the container T by means of suitable braces 13 as shown, preferably extending to a point well below the upper edge of the container T and adjacent the lower wall 1 thereof. A funnel shaped hopper 14 is provided at the upper end of the duct D and the liquid to be filtered is conducted to this hopper through a pipe 15. Suitable means are preferably provided for continuously cleaning the interior surfaces of the hollow extension F and the filtering partitions P. In the embodiment of the invention disclosed, this means takes the form of a pair of cleaning brushes B carried by the radially extending arms 22 which are suitably connected to a vertical shaft 23 located within the inlet duct D. The inlet duct D is preferably formed in two sections, an upper section 25 and a lower section 26, and these sections are connected by a sleeve 27 which is rotatably journaled over the adjacent ends of the duct sections as shown. The lower section 26 of the duct D is supported by suitable brackets 28, and the shaft 23 is journaled and supported in a suitable thrust bearing 29 fixed to the lower duct section 26. The sleeve 27 is connected to the shaft 23 by a spider 30 or other suitable means, and the radial arms 22 are fixed to the outer surface of the sleeve 27. The brushes B are provided with a plurality of radially extending bristles 31 which are of a length sufficient to extend through the openings 10 in the inner wall 6 of the hollow extension F, and to engage the inner surface of the filtering partitions P.

A pair of scrapers S are connected to the lower end of the shaft 23 by the radial arms 32. The lower edges of the scrapers S may be provided with flexible scraper blades 33 and the scrapers are angularly mounted on the arms 32 and lie parallel to the conical bottom wall 1 of the container T.

The shaft 23 is slowly and continuously rotated by a suitable source of power through a reduction gear train 34, and the brushes B, together with the scrapers S, are continuously moved respectively over the interior surface of the filtering means and the bottom wall of the filtering container.

A circular trough 35 is suitably secured to the outer surface of the vertical side walls 36 of the container T below the openings 10 in the outer wall 7 of the hollow filtering extension F. This trough is preferably inclined and is provided with an outlet pipe 37 at the lowermost point thereof to conduct the effluent liquid therefrom.

The operation of the disclosed invention will now be described. One of the filtering partitions P is placed between each pair of supporting columns 19, being preferably disposed in the grooves 21 adjacent the inner walls 6 of the extension F. The solid laden liquid is delivered to the inlet duct D through the pipe 15 and flows into the container T, the liquid level rising rapidly to a point just above the lowermost openings 10 in the hollow filtering extension F. The liquid then flows outwardly through the filtering partitions P where the solid matter is trained therefrom, and the filtered effluent passes through the openings 10 in the outer wall 7 of the extension F, falls into the trough 35 and passes through the outlet pipe 37. As the solid laden liquid flows diagonally upward in the container T, the heavy solids settle therefrom and fall to the bottom wall 1 of the container T, where they are dislodged and delivered to the outlet pipe 2 by the continuously rotating scrapers S. If desired, the scrapers S may be helically curved to propel the solids toward the lower apex of the bottom wall 1. As the solid laden liquid rises in a diagonal path through the container T, the colloidal substances therein coagulate and fall to the bottom of the container and this coagulation is further promoted by the contact of the liquid with the inwardly projecting lips 11 on the inner wall 6 of the extension F. The lips 11 act as baffles and partially reverse the flow of the liquid, thereby causing the intermingling and coagulation of the colloidal solids at this point.

The solid matter which collects on the inner surface of the filter partitions P is removed to a certain extent by the rotating brushes B and falls to the bottom of the container T. When the lower portions of the filtering partitions P become clogged with solid material, the liquid within the container builds up to a higher level and flows outwardly through the clean portions of the filtering partitions P above the former liquid level. In this manner, clean sections of the filtering material are automatically imposed in the path of the liquid as the lower portions of the filtering material become clogged, and the level of the liquid within the container at all times indicates the amount of clean filtering material available for continued filtration. Further, since the liquid within the container T is unconfined, the clogging of the filtering partitions does not materially increase the hydraulic pressure imposed thereon by the liquid, and the rupture or injury of the filtering means by hydraulic pressure is thereby avoided.

When substantially the entire surface of the filtering partitions P have become clogged with solid matter, this condition is indicated by a high liquid level in the container T and the partitions are replaced by clean partitions. In accordance with the present invention, this may be accomplished without even temporarily interrupting the filtration operation, the clean filtering partitions being inserted between the columns 19 in the outside grooves 21 before the clogged partitions are removed from the inner grooves 21. After the filtering partitions so inserted have become clogged, clean partitions are inserted between the columns 19 in the inner grooves 21, and this process is repeated at suitable intervals which are indicated to the operator by the level of the liquid in the container T. The clogged filtering partitions P removed from the extension F are cleaned by immersion in hot water or in any other suitable manner.

During the filtration process, the cut-off valve 3 in the outlet pipe 2 is open and the valve 5 in the pipe 4 below the ejector E is closed. The solids which coagulate and settle from the liquid within the tank T, as well as the solids dislodged from the interior of the extension F by the brushes B, settle to the bottom wall 1 of the tank and are dislodged and delivered to the ejector E through the pipe 2. After this sludge has reached a level above the upper end of the outlet pipe 2, the valve 3 is closed, the valve 5 is opened and the ejector E is operated to remove the sludge therefrom through the pipe 4. After this ejection operation, the valve 5 is closed, the valve 3 is opened, and a new charge of sludge is permitted to accumulate within the ejector E. The ejecting operation is repeated at suitable intervals as the filtration process continues.

In a modified form of the invention, illustrated in Fig. 4, the hollow extension F may be filled with a filtering medium 38 of stranded, fibrous or granulated nature. This filtering material may comprise finely divided metallic strands packed into intimate relation as shown in my copending applications, Serial No. 233,497, filed November 15, 1927 and Serial No. 282,217, filed June 1, 1928, or any other suitable substance may be packed within the extension F. In order to prevent the escape of this material through the openings 10 in the side walls 6 and 7 of the extension F, screens or other permeable retaining means 39 are preferably placed over these openings, as shown in Fig. 4. The filtering material 38 strains the solid matter from the liquid passing through the extension F, and this material is removed and cleaned when the liquid level in the container indicates that the filtered solids have clogged the filtering partitions to a high level.

From the description given, it will be readily apparent that the filtration device of the present invention incorporates many advantageous features. Due to the vertical arrangement of the filtering means, the hydraulic head of the liquid impinging thereon never becomes excessive and the rupture or injury of the filtering means by the filtered liquid is thereby avoided. The level of the liquid within the filtering container constantly indicates the condition of the filtering means and thus enables the operator to know just when the filtering means should be cleaned or replaced, regardless of the rate at which the solid material may be collecting thereon. The filtering partitions may be quickly and easily removed and replaced without any interruptions in the filtration process and standby equipment is thereby unnecessary. The inner surfaces of the filtering means and the bottom wall of the container are continuously cleaned by the brushes B and the scrapers S thereby avoiding the necessity of interrupting the filtration process to clean out the container. The protruding lips 11 adjacent the openings 10 in the outer side walls 7 of the filtering extension F carry the effluent liquid away from the side walls of the extension and cause the aeration of this liquid as it falls into the trough 35.

Although the filtration device of the present invention has been described in connection with a rather specific embodiment, it should be understood that the invention is not limited to the specific arrangement and construction herein disclosed. For example, the shape and arrangement of the tank T and the filtering extension F thereon may be widely varied, any suitable filtering material may be employed to form the partitions P, and numerous changes, modifications or omissions may be made without departing from the scope of the invention as defined by the appended claims.

I claim:

1. In a device for treating solid laden liquids, a container, means for introducing a solid laden liquid to said container, a continuous hollow extension secured to and extending completely around the upward edges of the side walls of said container, said extension having a plurality of openings in the inner and outer walls thereof, and a plurality of superimposed separately removable filtering partitions disposed within said hollow extension.

2. In a device for treating solid laden liquids, a container, means for introducing a solid laden liquid to said container, a plurality of vertically extending supporting means secured to the upper edges of the side walls of said container and a plurality of superimposed parallel permeable filtering partitions carried between successive pairs of said supporting means and separately slidably removable therefrom, said filtering partitions forming a substantially continuous filtering extension on the side walls of said container.

3. In a device for treating solid laden liquids, a container, means for introducing a solid laden liquid to said container, a plurality of vertically extending supporting means secured to the upper edges of the side walls of said container, a set of permeable filtering partitions, each carried between successive pairs of said supporting means and slidably removable vertically from between said supporting means, and means on each of said supporting means for removably supporting a second permeable filtering partition in superimposed relation to each partition of said first mentioned set.

4. In a device for treating solid laden liquids, a container, means for introducing a solid laden liquid to said container, a plurality of vertically extending supporting columns secured to the upper edges of the side walls of said container, and means on said columns for slidably supporting a plurality of superimposed permeable filtering partitions between each successive pair of said columns whereby a clean filtering partition may be imposed in the path of the solid laden liquid before a clogged filtering partition is removed.

5. In a device for treating solid laden liquids, a container, means for introducing a solid laden liquid to said container, a continuous hollow extension secured to and extending completely around the upper edges of the side walls of said container and forming a vertical continuation thereof, said extension having a plurality of openings in the inner and outer side walls thereof, a plurality of separate filtering partitions disposed between the side walls of said hollow extension, and means within said extension for removably supporting a plurality of filtering partitions in superimposed relation.

6. In a device for treating solid laden liquids, a circular container, means for introducing a solid laden liquid to said container at a point near the center thereof, a continuous hollow extension secured to and extending upwardly from the upper edge of the side wall of said container, a plurality of superimposed permeable filtering partitions in continuous end-to-end relation within said extension, and means for removably supporting each of said filtering partitions within said hollow extension.

7. In a device for treating solid laden liquids, a container, means for introducing a solid laden liquid to said container, a plurality of vertically extending filtering partitions removably secured to the upper edges of the side walls of said container and disposed in end-to-end relation to form a substantially continuous filtering extension on the side walls of said container, and means for removably supporting a plurality of filtering partitions in concentric superimposed relation to said first mentioned filtering partitions.

In testimony whereof I affix my signature.
CHARLES T. CABRERA.